US006892691B1

(12) United States Patent
Uhl et al.

(10) Patent No.: US 6,892,691 B1
(45) Date of Patent: May 17, 2005

(54) METHOD FOR OPERATING AN INTERNAL COMBUSTION ENGINE

(75) Inventors: Stephan Uhl, Friedrichshafen (DE); Andreas Roth, Muehlacker-Lomersheim (DE)

(73) Assignee: Robert Bosch GmbH, Stuttgart (DE)

( * ) Notice: Subject to any disclaimer, the term of this patent is extended or adjusted under 35 U.S.C. 154(b) by 398 days.

(21) Appl. No.: 10/088,918

(22) PCT Filed: Aug. 30, 2000

(86) PCT No.: PCT/DE00/02950

§ 371 (c)(1),
(2), (4) Date: Apr. 25, 2002

(87) PCT Pub. No.: WO01/23734

PCT Pub. Date: Apr. 5, 2001

(30) Foreign Application Priority Data

Sep. 24, 1999 (DE) .......................... 199 45 813

(51) Int. Cl.[7] .............................................. F02B 77/00
(52) U.S. Cl. .................................. 123/198 A; 701/123
(58) Field of Search .......................... 123/1 A, 198 A; 701/99, 101, 123

(56) References Cited

U.S. PATENT DOCUMENTS

| | | | | |
|---|---|---|---|---|
| 3,981,624 A | * | 9/1976 | Brandon | 417/53 |
| 4,425,937 A | * | 1/1984 | Stein | 137/480 |
| 4,841,765 A | | 6/1989 | Blanke | |
| 4,989,561 A | * | 2/1991 | Hein et al. | 123/198 A |
| 5,337,708 A | * | 8/1994 | Chen | 123/198 A |
| 5,845,225 A | | 12/1998 | Mosher | |
| 5,858,942 A | * | 1/1999 | Adams et al. | 510/185 |
| 6,090,170 A | * | 7/2000 | Yun et al. | 44/433 |
| 6,257,217 B1 | * | 7/2001 | Yamazaki et al. | 123/668 |
| 6,530,392 B2 | * | 3/2003 | Blatter et al. | 137/240 |

FOREIGN PATENT DOCUMENTS

| | | |
|---|---|---|
| DE | 198 28 279 | 12/1999 |
| DE | 100 09 065 | 9/2001 |
| EP | 0 761 961 | 3/1997 |
| JP | 2000 161192 | 6/2000 |

* cited by examiner

Primary Examiner—John T. Kwon
(74) Attorney, Agent, or Firm—Walter Ottesen

(57) ABSTRACT

The operation of an internal combustion engine under unfavorable operating conditions can lead to the formation of deposits in the combustion chamber (4). A method and an arrangement for operating an internal combustion engine (1), especially of a motor vehicle, is suggested, wherein fuel is conducted into a combustion chamber (4) and is there combusted. When deposits are detected in the combustion chamber (4), measures are initiated in a targeted manner for cleansing the combustion chamber (4). A knocking combustion is especially introduced and/or a cleansing liquid is added to the inducted combustion air.

19 Claims, 3 Drawing Sheets

METHOD FOR OPERATING AN INTERNAL COMBUSTION ENGINE

FIELD OF THE INVENTION

The invention relates to a method and an arrangement for operating an internal combustion engine, especially of a motor vehicle, wherein fuel is directed into the combustion chamber and there combusted.

BACKGROUND OF THE INVENTION

The operation of internal combustion engines in the presence of unfavorable operating conditions can lead to the formation of deposits in the combustion chamber. Especially for engines having direct fuel injection, deposits can form, for example, on the injection valves, that is, on the tips or in the tips of the injection valves. These deposits can operate unfavorably on the spray preparation and therefore on the combustion. As a rule, one speaks of a coking of the injection valves.

An electronic control arrangement is known from DE 198 28 279 A1 by means of which an equalization of the cylinder-individual torque contributions can be carried out in a multi-cylinder engine. Here, to balance the cylinder-individual torque contributions, the injected fuel quantity, the ignition time point (for a spark-ignition engine), the exhaust gas recirculation rate or the injection position are varied. The determination of the cylinder-individual torque contributions can take place via the evaluation of the time-dependent trace of the rotational movement of the crankshaft or camshaft and wherein individual segment times are detected. Alternatively, rough running values can be used which are anyway formed in the control apparatus for the detection of combustion misfires. The aim of the cylinder equalization is to minimize the rough running values with a control concept. Corresponding interventions can be undertaken on the engine in dependence upon the detected pattern and from the magnitude of the individual filtered and unfiltered rough running values. A coking of injection valves can cause a torque of the corresponding cylinder which is too low especially in an engine having direct injection. In this case, the corresponding cylinder runs too lean. The main components for the control function are cylinder-individual PI controllers in correspondence to DE 198 28 279 A1.

U.S. patent application publication 2003/0159677 describes a method and an arrangement for monitoring the effects of a cylinder equalization control. Corresponding to the introduction of the description, it is a special requirement for a direct-injecting spark-ignition engine. Here, an increased rough running can occur caused by a low tolerance compatibility of the combustion process in stratified operation and/or because of tolerances of the high pressure injection valves which are used or in the distribution of the fuel to the individual cylinders. Also, deterioration-caused changes of the throughflow characteristics of the high pressure injection valves can have an effect. In the context of U.S. patent application publication 2003/0159677, preferably the torque contribution (actual torque) of a cylinder relative to its ignition predecessor is detected (that is, no absolute torque determination) via an evaluation of the time-dependent trace of the crankshaft rotation or camshaft rotation. Improvements in the area of cylinder equalization are achieved in that a monitoring of the effects for the cylinder equalization control is provided and in that a corresponding fault signal is generated for disturbances in the area of the cylinder equalization control. The monitoring of the effects takes place in such a manner that the cylinder-individual torque contributions can be checked after a completed cylinder equalization control intervention to determine if the control shows an effect. If the effect does not occur to the extent as wanted, the control loop amplification of the cylinder-individual PI controllers is successively reduced to a pregiven end value. The control thereby functions with greater robustness but is dynamically slower which is accepted. If the wanted effect does not occur after adjusting the PI controllers to the pregiven end value, then a fault signal is generated.

The disclosure of the last-mentioned U.S. patent application publication 2003/0159677 is expressly incorporated into this application.

SUMMARY OF THE INVENTION

The present invention has as its object to provide a method of the above kind with which depositions in the combustion chambers of the engine can be detected and removed in a simple manner.

The especially great advantage of the present invention is that the combustion chamber can be kept free of deposits with simple means over the entire service life of the engine, whereby always optimal conditions are given for a good combustion.

A further advantage of the invention is that the combustion temperature is reduced with the injection of water and, associated therewith, the NOx emission becomes lower. Furthermore, the thermodynamic efficiency of the engine is improved because of the water vapor pressure of the water vaporized in the combustion chamber at high temperature.

BRIEF DESCRIPTION OF THE DRAWINGS

The invention will now be described with respect to the drawings.

DESCRIPTION OF THE PREFERRED EMBODIMENTS OF THE INVENTION

Figure 1:
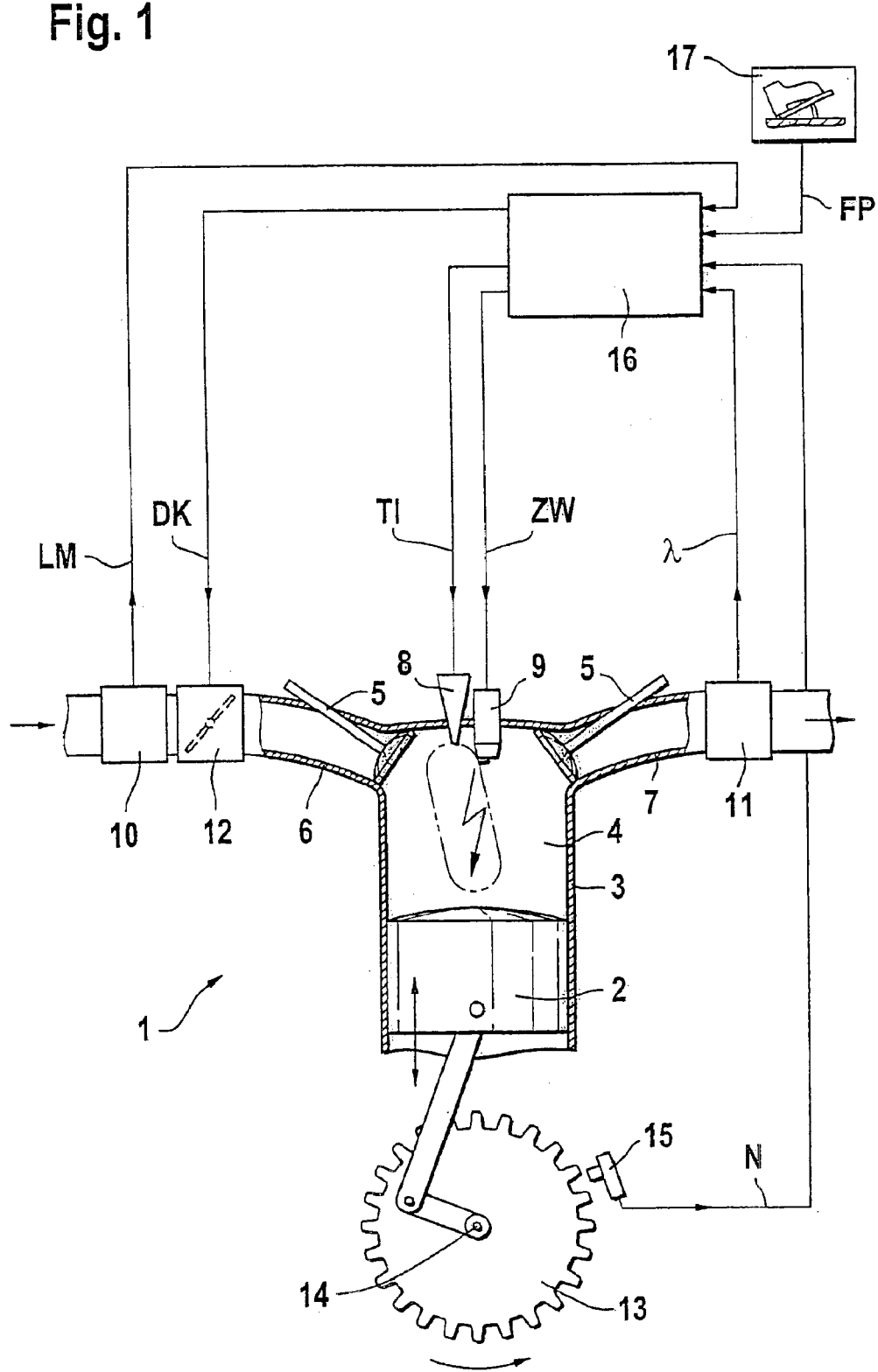
FIG. 1 schematically shows an internal combustion engine having a control apparatus.

FIG. 1, an internal combustion engine 1 is shown wherein a piston 2 is movable back and forth in a cylinder 3. The cylinder 3 is provided with a combustion chamber 4 to which an intake manifold 6 and an exhaust-gas pipe 7 are connected via valves 5. Furthermore, an injection valve 8 and a spark plug 9 are associated with the combustion chamber 4. The injection valve 8 is driven by a signal TI and the spark plug 9 is driven by a signal ZW. The signals TI and ZW are transmitted by a control apparatus 16 to the injection valve 8 and the spark plug 9, respectively.

The intake manifold 6 is provided with an air mass sensor 10 and the exhaust-gas pipe 7 is provided with a lambda sensor 11. The air mass sensor 10 measures the air mass of the fresh air supplied to the intake manifold 6 and generates a signal LM in dependence thereon. The lambda sensor 11 measures the oxygen content of the exhaust gas in the exhaust-gas pipe 7 and generates a signal lambda in dependence thereon. The signals of the air mass sensor 10 and of the lambda sensor 11 are supplied to the control apparatus 16.

A throttle flap 12 is accommodated in the intake manifold 6 and the rotational position of the throttle flap is adjusted by means of a signal DK.

In a first mode of operation, the stratified operation of the engine 1, the throttle flap 12 is opened wide. The fuel is injected into the combustion chamber 4 by the injection valve 8 during a compression phase caused by the piston 2. Then, the fuel is ignited with the aid of the spark plug 9 so that the piston 2 is driven in the next work phase by the expansion of the ignited fuel.

In a second operating mode, the homogeneous operation of the engine 1, the throttle flap 12 is partially opened or closed in dependence upon the desired supplied air mass. The fuel is injected into the combustion chamber 4 by the injection valve 8 during an induction phase caused by the piston 2. Because of the simultaneously inducted air, the injected fuel is swirled and it is thereby essentially uniformly distributed in the combustion chamber 4. Thereafter, the air/fuel mixture is compressed during the compression phase in order to then be ignited by the spark plug 9. The piston 2 is driven with the expansion of the ignited fuel.

In the stratified operation as well as in the homogeneous operation, a rotational movement is imparted by the driven piston to a crankshaft 14 via which the wheels of the motor vehicle are driven. A toothed wheel 16 is mounted on the crankshaft 14 and the teeth thereof are scanned by an rpm sensor 15 mounted directly opposite. The rpm sensor 15 generates a signal from which the rpm N of the crankshaft 14 is determined and the sensor transmits this signal to the control apparatus 16.

The fuel mass, which is injected into the combustion chamber by the injection valve 8 in stratified operation and in homogeneous operation, is controlled (open loop and/or closed loop) by the control apparatus 16 especially with the view to a low consumption of fuel and/or a low development of toxic substances. For this purpose, the control apparatus 16 is provided with a microprocessor which has a program stored in a storage medium, especially in a read-only-memory (ROM), which program is suited to carry out the entire control (open loop and/or closed loop) of the engine 1.

Input signals are applied to the control apparatus 16 and represent operating variables of the engine which are measured by means of sensors. For example, the control apparatus 16 is connected to the air mass sensor 10, the lambda sensor 11 and the rpm sensor 15. Furthermore, the control apparatus 16 is connected to an accelerator pedal sensor 17 which generates a signal FP, which indicates the position of an accelerator pedal actuated by the driver and therefore the torque commanded by the driver. The control apparatus 16 generates output signals with which the performance of the engine 1 can be influenced in correspondence to the desired control (open loop and/or closed loop) via actuators. For example, the control apparatus 16 is connected to the injection valve 8, the spark plug 9 and the throttle flap 12 and generates the signals TI, ZW and DK, which are needed to drive the foregoing.

Figure 2:
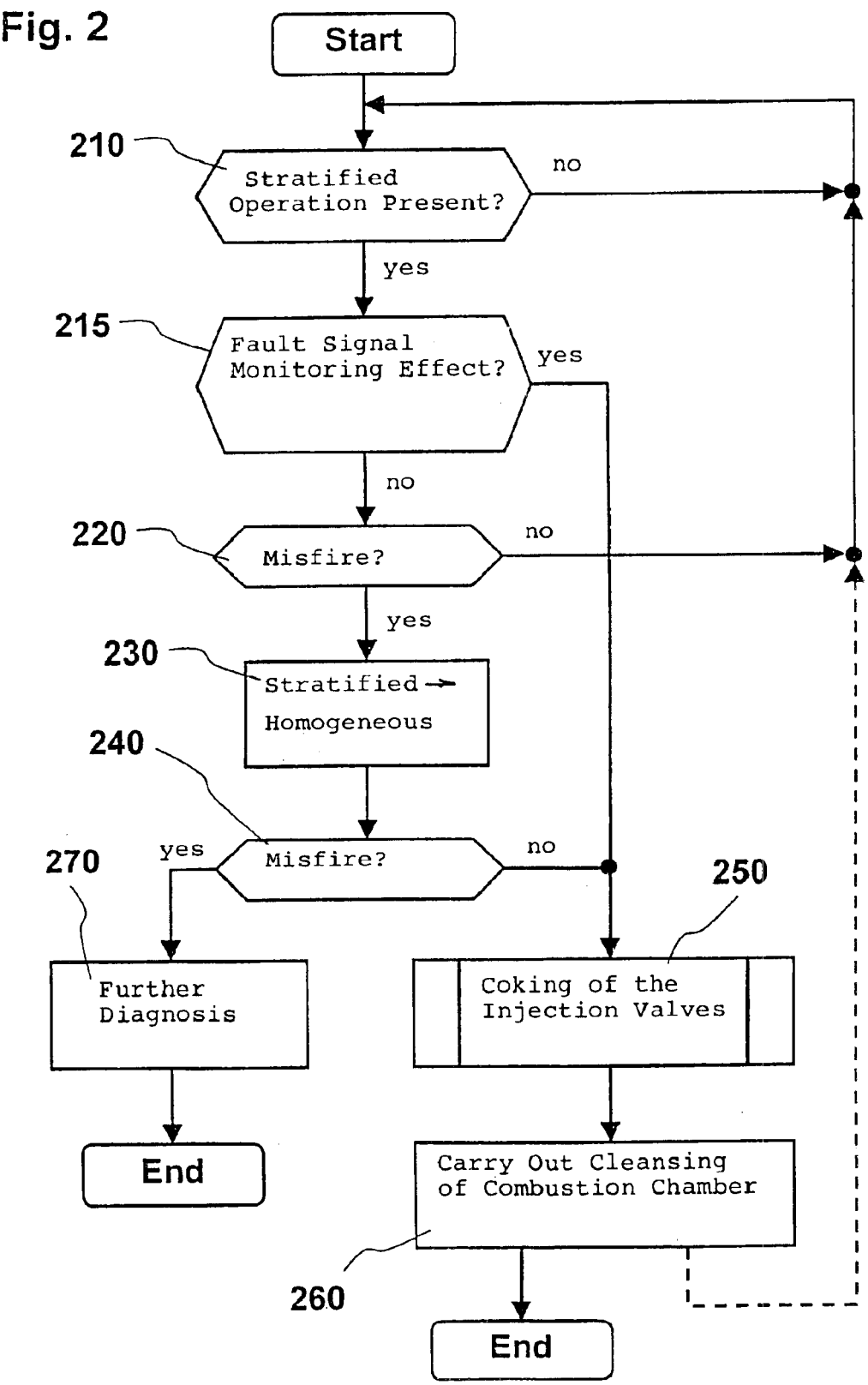
FIG. 2 shows a flowchart of the method of the invention.

FIG. 2 shows a flowchart of the method of the invention especially for an internal combustion engine having gasoline-direct injection.

Step 215 is described in FIG. 2. In this step, an inquiry is made as to the effect of the cylinder equalization control and is based, for example, on the method for monitoring the effects of a cylinder equalization control described in U.S. patent application publication 2003/0159677. The input data needed herefor are supplied by the rpm sensor 15 to the control apparatus 16, which, on this basis, undertakes the control/adaptation of the cylinder-individual torque contributions. For this purpose, for example, the injected fuel quantity TI, the ignition time point ZW, the exhaust-gas recirculation rate (not shown in FIG. 2) or the injection position DK is varied by the control apparatus 16.

After a start of the method, a check is made in step 210 as to whether stratified operation is present. As long as no stratified operation is given, this inquiry is carried out continuously. If, in contrast, stratified operation is present, then a check is made in step 215 as to whether a fault signal of the monitoring of effects is present. If this is the case (that is, the cylinder equalization shows no effect), a transition is made directly to step 250, which is described in detail hereinafter. Accordingly, a conclusion is directly drawn as to coking. If, in contrast, it is established in step 215 that the monitoring of the effects of the cylinder equalization generates no fault signal, then a check is made in step 220 as to whether combustion misfires occur in the operating mode "stratified operation". If no combustion misfires can be determined, then there is a return to step 210. If, in contrast, combustion misfires are detected, then, there is a switchover in step 230 from the operating mode "stratified operation" into the operating mode "homogeneous operation" with the aid of the control apparatus 16.

In step 240, as already in step 220, a check is made in the operating mode "homogeneous operation" as to whether combustion misfires occur. If no combustion misfires are determined, then a conclusion is drawn therefrom in step 250 that the injection valves are coked, that is, deposits have formed on the injection valves.

Deposits on the injection valves can lead to the spray preparation being disturbed in the direct injection of gasoline. Approximately the same fuel quantity is injected into the combustion chamber 4 but the spray form or the spray guidance is changed because of the deposits. This has negative effects especially in stratified operation because, at the ignition time point, no ignitable air/fuel cloud is present in the direct vicinity of the spark plug 9 whereby combustion misfires occur or even no combustion takes place. In the homogeneous operation, a slight coking of the injection valves disturbs little because here the combustion is not essentially dependent upon the spray guidance of the injected fuel. The fuel is injected early, namely, already during the induction phase, whereby sufficient time is present for a uniform distribution.

In step 260, measures are initiated in order to remove the deposits on the injection valves 8. Alternatively to ending the method shown in FIG. 2, a jump back to step 210 can take place after step 260 in order to check whether the measures for combustion chamber cleaning were successful. This alternative is indicated by a broken line.

A knocking combustion can be used as a measure for removing deposits. Investigations on internal combustion engines, which were operated with knocking combustion, show that these engines have very clean combustion chambers. This effect is utilized in this invention.

This can be attributed to pressure fluctuations which are generated by the knocking combustion, with these pressure fluctuations being superposed on the normal pressure trace. With the additional pressure fluctuations, intense high frequency vibrations are generated whereby the deposits in the combustion chamber 4 and especially on the nozzles of the injection valves 8 can be removed. The knocking combustion must be limited in time in order to avoid damage to the engine 1.

Also, water or any desired other cleaning liquid can be added to the inducted combustion air in combination with the knocking combustion or even as an independent method whereby a similar cleaning effect can be achieved as with the knocking combustion. Investigations of engines wherein water has penetrated into the combustion chamber 4 (via a non-tight cylinder head seal or injected additionally) have shown that these engines always have especially clean combustion chambers.

This effect is used in this invention.

After the combustion cleaning has been carried out, a switchover to stratified operation again takes place in order to check whether the engine 1 runs without misfires. If misfires are again determined, the method can again be started anew.

As a precaution or to avoid the occurrence of deposits in the combustion chamber, a knocking combustion can be carried out and/or water can be added to the air at specific time intervals.

If combustion misfires were detected in step 240 also in homogeneous operation, then, in step 270, a further diagnostic method is started. The combustion misfires, in this case, cannot be caused exclusively by deposits on the nozzles of the injection valves. For example, these combustion misfires can also be cause by an injection valve 8, which no longer opens in a controlled manner, or by a defective spark plug 9. A coking of the injection valves 8 can, in this case, not be completely precluded. In any case, the reasons for these combustion misfires must be narrowed by further diagnostic methods. A corresponding storage of the faults in a fault memory can be helpful in a later repair in order to obtain a precise diagnosis.

Figure 3:
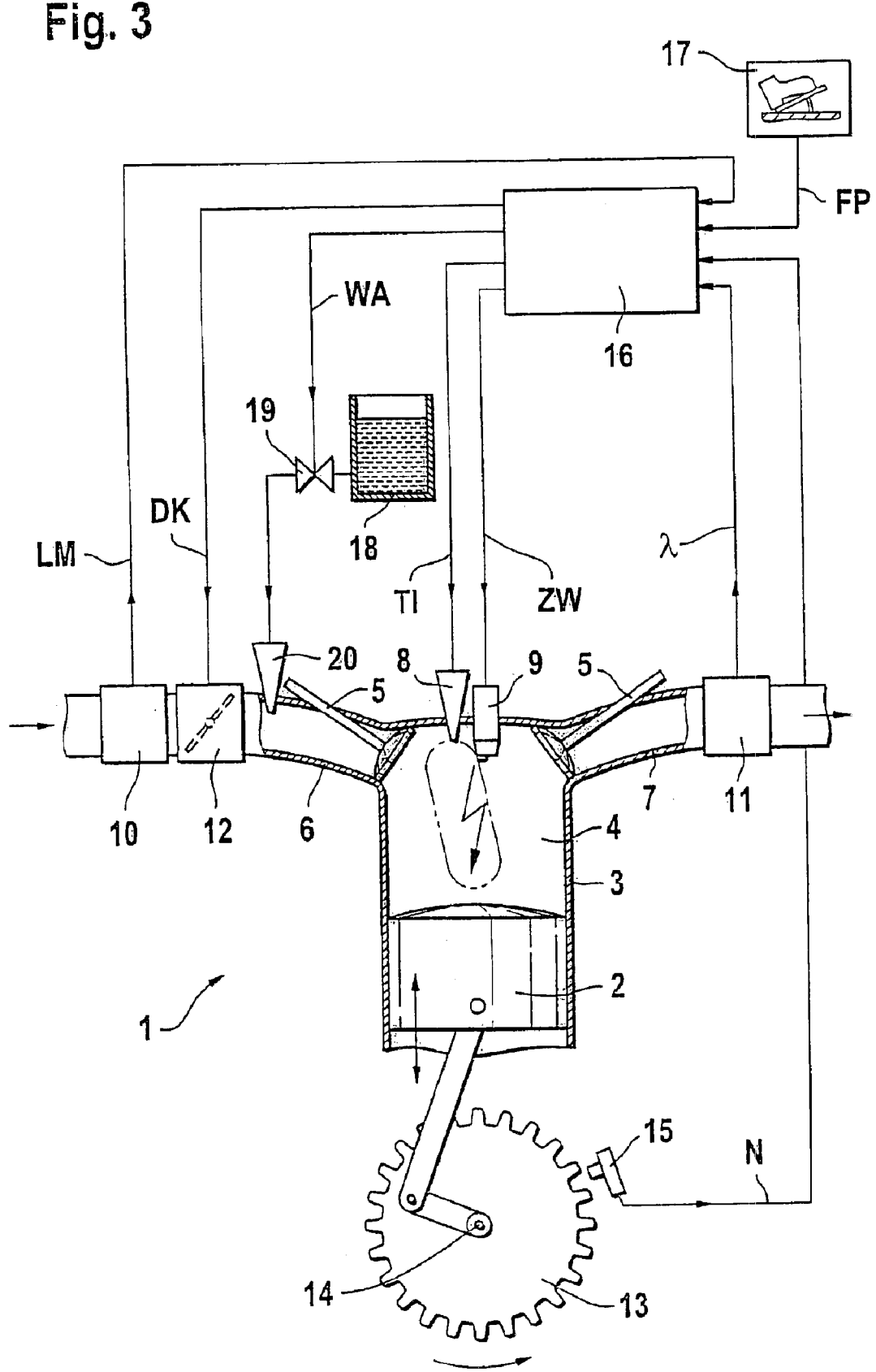
FIG. 3 schematically shows an internal combustion engine having a control apparatus and having a device with which water or any other desired cleaning liquid can be added to the inducted combustion air.

FIG. 3 shows an internal combustion engine 1 having a control apparatus 16, as already shown in FIG. 1, and with a device with which water or any desired other cleaning liquid can be added to the air. For the sake of simplicity, the reference numerals of FIG. 1 are taken over for the same components.

A water vessel 18 is additionally mounted on the engine 1. A valve 19 is mounted on the water vessel 18 which can be driven with the aid of the control apparatus 16. The valve 19 is connected to an injection nozzle 20. With the aid of the nozzle 20, water can reach directly into the intake manifold 6 when actuating the valve 19.

If, for example, deposits on the injection valves 8 are detected by the control apparatus 16, a signal WA is generated with which the valve 19 is driven or opened. Because of the underpressure which, as a rule, is present in the intake manifold 6, water is introduced into the intake manifold 6 from the water vessel 18 via the valve 19 and the nozzle 20 when the valve 19 is opened. With the next induction operation of the engine 1, water in the intake manifold 6 reaches the combustion chamber 4. There, the water mixes with the air and fuel reaching the combustion chamber during the injection operation. Because of the high temperature in the combustion chamber 4, the water vaporizes immediately and contributes to the cleaning of the combustion chamber.

Although an internal combustion engine having gasoline direct injection was selected as an example, it is possible to apply this method in a somewhat modified form even to other internal combustion engines such as a diesel engine or an internal combustion engine having intake manifold injection.

A special embodiment of the method of the invention is its realization in the form of a computer program having program code means. Such a computer program can be stored on a storage medium such as a CD-ROM or an EPROM and makes it possible to introduce the method steps of the invention for combustion chamber cleanup when the computer program is executed in a control apparatus (that is, generally in any desired computer). In this way, it affords the manufacturer of such a product a simple possibility to supply the product to a customer.

What is claimed is:

1. A method for operating an internal combustion engine including an engine for a motor vehicle, the method comprising the steps of:
   directing fuel into a combustion chamber of said engine and combusting said fuel therein;
   drawing a conclusion as to deposits in said combustion chamber from at least monitoring the effects of a cylinder equalization during operation of said engine; and,
   thereafter initiating measures in a targeted manner for cleansing said combustion chamber while said engine continues to be in operation.

2. The method of claim 1, comprising at least one of the following further steps of:
   bringing about a knocking combustion to cleanse said combustion chamber; and,
   adding a cleansing or detergent liquid to combustion air inducted by said engine.

3. The method of claim 2, wherein said cleansing liquid is water.

4. The method of claim 2, wherein said measures are conducted for a predetermined time duration.

5. The method of claim 2, wherein said measures for cleansing said combustion chamber are carried out so long until no deposits are detected in said combustion chamber.

6. The method of claim 5, wherein said measures for cleansing said combustion chamber are carried out only so long as no damage to said engine is to be expected.

7. The method of claim 1, wherein said measures for cleansing said combustion chamber are carried out as a precaution at predetermined time intervals for a predetermined time duration.

8. A method for operating an internal combustion engine including an engine for a mother vehicle, the method comprising the steps of:
   directing fuel into a combustion chamber of said engine and combusting said fuel therein;
   drawing a conclusion as to deposits in said combustion chamber from at least monitoring the effects of a cylinder equalization;
   thereafter initiating measures in a targeted manner for cleansing said combustion chamber;
   directly injecting fuel into the combustion chambers of said engine with the aid of injection valves in a first operating mode during a compression phase or in a second operating mode during an induction phase;
   continuously carrying out a misfire detection;
   when detecting misfires during operation of said engine in said first operating mode, then switching over into the second operating mode; and,
   when misfires also occur in the second operating mode, drawing a conclusion as to a general fault and starting additional diagnostic methods for narrowing down the fault causes.

9. The method of claim 1, wherein said engine is a diesel engine.

10. A method for operating a direct-injecting internal combustion engine including an internal combustion engine of a motor vehicle, the method comprising the steps of:

directly injecting fuel into the combustion chambers of said engine with the aid of injection valves in a first operating mode during a compression phase or in a second operating mode during an induction phase;

continuously carrying out at least one of a cylinder equalization with monitoring of effects and a misfire detection;

drawing a conclusion as to the coking of the injection valves when a fault signal of said monitoring of effects is present or, when detecting a misfire during operation of said engine in said first operating mode, switching over to said second operating mode; and, when no misfire occurs in said second operating mode, drawing a conclusion as to deposits on the nozzles of said injection valves or a coking of said injection valves.

11. The method of claim 10, comprising at least one of the following further steps of:

bringing about a knocking combustion to cleanse said combustion chamber; and, adding a cleansing or detergent liquid to combustion air inducted by said engine.

12. The method of claim 11, wherein said cleansing liquid is water.

13. The method of claim 11, wherein said measures are conducted for a predetermined time duration.

14. The method of claim 11, wherein said measures for cleansing said combustion chamber are carried out so long until no deposits are detected in said combustion chamber.

15. The method of claim 14, wherein said measures for cleansing said combustion chamber are carried out only so long as no damage to said engine is to be expected.

16. The method of claim 10, wherein said measures for cleansing said combustion chamber are carried out as a precaution at predetermined time intervals for a predetermined time duration.

17. A computer program comprising:

program-code means for carrying out a method for operating an internal combustion engine when executed on a computer, the method including the steps of:

directing fuel into a combustion chamber of said engine and combusting said fuel therein;

drawing a conclusion as to deposits in said combustion chamber from at least monitoring the effects of a cylinder equalization during operation of said engine; and, thereafter initiating measures in a targeted manner for cleansing said combustion chamber while said engine continues to be in operation.

18. A control apparatus for operating an internal combustion engine including an internal combustion engine of a motor vehicle, the control apparatus comprising:

means for controlling the supply of fuel into a combustion chamber of said engine and combusting said fuel therein;

means for drawing a conclusion as to deposits in said combustion chamber from at least monitoring the effects of a cylinder equalization during operation of said engine; and, means for initiating measures in a targeted manner for cleansing said combustion chamber while said engine continues to be in operation.

19. An internal combustion engine including an engine for a motor vehicle, the internal combustion engine comprising:

a cylinder and a piston conjointly defining a combustion chamber;

means for metering fuel to said combustion chamber; and, a control apparatus functioning to: control the metering of fuel into a combustion chamber of said engine and combusting said fuel therein; draw a conclusion as to deposits in said combustion chamber from at least monitoring the effects of a cylinder equalization during operation of said engine; and, thereafter initiate measures in a targeted manner for cleansing said combustion chamber while said engine continues to be in operation.

* * * * *

UNITED STATES PATENT AND TRADEMARK OFFICE
CERTIFICATE OF CORRECTION

PATENT NO.    : 6,892,691 B1
DATED         : May 17, 2005
INVENTOR(S)   : Stephan Uhl and Andreas Roth It is certified that error appears in the above-identified patent and that said Letters Patent is hereby corrected as shown below:

Column 6,
Line 44, delete "mother" and substitute -- motor -- therefor.

Signed and Sealed this

Twelfth Day of July, 2005

JON W. DUDAS
*Director of the United States Patent and Trademark Office*